United States Patent [19]

Stemme

[11] 4,344,683
[45] Aug. 17, 1982

[54] QUALITY CONTROL METHOD AND APPARATUS FOR PHOTOGRAPHIC PICTURES

[75] Inventor: Otto Stemme, Munich, Fed. Rep. of Germany

[73] Assignee: Agfa-Gevaert Aktiengesellschaft, Leverkusen, Fed. Rep. of Germany

[21] Appl. No.: 188,278

[22] Filed: Sep. 18, 1980

[30] Foreign Application Priority Data

Sep. 29, 1979 [DE] Fed. Rep. of Germany ....... 2939681

[51] Int. Cl.³ .................... G03B 27/52; G03B 27/32; G03B 17/24
[52] U.S. Cl. ................................ 354/106; 355/40; 355/77
[58] Field of Search .................... 355/40, 77; 354/106, 354/107, 109, 110, 202 FF; 356/390

[56] References Cited

U.S. PATENT DOCUMENTS

| | | | |
|---|---|---|---|
| 1,849,939 | 3/1932 | Lipshitz | 354/109 |
| 2,273,876 | 2/1942 | Lutz et al. | 354/109 X |
| 3,242,801 | 3/1966 | Shay et al. | 354/79 X |
| 3,618,495 | 11/1971 | Kuhns | 354/106 X |
| 3,718,074 | 2/1973 | Davis | 354/109 |
| 3,736,856 | 6/1973 | Grossmann et al. | 354/106 X |
| 4,025,932 | 5/1977 | Miyagawa | 354/109 |
| 4,123,767 | 10/1978 | Halpern | 354/107 |
| 4,183,659 | 1/1980 | Brunner | 355/40 |
| 4,211,558 | 7/1980 | Oguchi et al. | 354/109 X |

*Primary Examiner*—Donald A. Griffin
*Attorney, Agent, or Firm*—Michael J. Striker

[57] ABSTRACT

A test pattern in form of a raster or the like is imaged in a camera onto a margin of a film frame. When the film frame is subsequently converted into a negative which is thereafter printed as a positive, the test pattern is printed in the margin of the photographic image on the positive. Should the image be blurred, it is possible to determine whether the cause of blurring occurred in the camera or during printing, by examining the test pattern which, if blurring occurred in the camera, will be sharp but will itself be blurred if the blurring of the image occurred during printing. The pattern can also be applied to the film frame by the film manufacturer or else in a pre-splicer prior to developing of the exposed film. A method, an apparatus and a pattern carrier are disclosed.

3 Claims, 6 Drawing Figures

QUALITY CONTROL METHOD AND APPARATUS FOR PHOTOGRAPHIC PICTURES

BACKGROUND OF THE INVENTION

The present invention relates to quality control in connection with photographic pictures.

More particularly, the invention relates to a method of controlling the quality of photographic pictures during taking of the pictures and/or during printing of the pictures.

The invention also relates to apparatus for carrying out the method.

It is well known that various error sources exist which may lead to unsatisfactory photograhic pictures, during the actual picture-taking and/or during subsequent printing of the paper pictures. Until now, the consumer has had no way of determining exactly where such errors have occurred, i.e. who (or what) may be at fault.

Exposure and color errors can largely be compensated during developing and/or printing and therefore present no problem of great magnitude. However, such corrections are not possible when a picture is out of focus, at least not where amateur photography is concerned. The only real solution here is to eliminate the error source—but to do this it is necessary to locate the error source, which was not heretofore readily possible.

The difficulty is that a lack of sharpness can be caused by a variety of circumstances. It may be due to the consumer's own error in moving the camera while taking a picture or in improperly focussing the lens. It may also be due to rapid movement of the object being photographed. However, the problem can equally well be caused by a faulty lens or by the film not being located completely planar opposite the film window; in some instances the source of error may reside with the maker of the camera and/or the film. Then again, the film may not have been properly inserted into the camera or it may have been stored in the same for too long a period of time.

Other error possibilities have to do with film handling by the photo-finisher, i.e., the laboratory where the film is developed and printed. The printer may be defocussed during making of the paper pictures, the transportation and exposure phases may overlap in the printer, or the film and/or photographic paper may not be in proper planar position during printing.

Evidently, pin-pointing the error source is of importance here. If the error was made by the photo-finisher, then the consumer can after all obtain a useful picture simply by requesting that a new print be made. If the error has occurred while the film was still in the camera, i.e., during the picture-taking phase, it can evidently not be corrected by making a new print—a second print would be as poor as the first one and, even if it is furnished free of charge, this will lead to a certain degree of customer dissatisfaction.

It is therefore desirable for the consumer to be able to determine in a simple manner and without detailed analysis of the photographic negative and of the positive picture, whether the error causing the unsharp condition has occurred in the camera or during processing by the photo-finisher.

SUMMARY OF THE INVENTION

Accordingly, it is an object of the invention to make such a determination possible.

A more particular object of the invention is to provide a quality control method which enables such a determination to be made in a simple, uncomplicated manner.

Another, no less important object of the invention is to provide an uncomplicated apparatus or device for carrying out this method.

In keeping with the above objects, and with still others which will become apparent as the description proceeds, one aspect of the invention resides in a novel photographic quality control method. Briefly stated, such a method may comprise the steps of imaging a test pattern onto a marginal area of a film frame; and upon conversion of the film frame into a negative, printing the test pattern in a marginal area of a positive made from the negative so that, in the event the photographic image on the positive is blurred, the absence or presence of blurring of the printed test pattern indicates whether blurring of the photographic image occurred during picture-taking or during printing of the positive.

Another aspect of the invention resides in an apparatus for carrying out the method. Such an apparatus may comprise first means for carrying a test pattern to be imaged; and second means activatable for imaging the test pattern onto a portion of a film frame located in a marginal zone of the film window.

It is clear that when the test pattern which has been exposed during picture taking in the margin of the negative, is sharp (i.e., in focus) on the subsequently printed paper picture while the remainder of the picture is out of focus (blurred), the error source is to be found in the picture-taking phase; i.e., the consumer error and/or camera defect and/or film defect. Under these circumstances it would be senseless to make a second print of the photograph on paper, since it is evidently the film negative that is unsharp. If, however, both the test pattern and the photograph itself are unsharp on the paper print, then the error source resides with the photo-finisher since the test pattern—which is exposed onto the negative margin camera-internally and is not influenced by such factors as misfocussing, camera movement or the like—will always be sharp on the negative; lack of sharpness of the test pattern on the paper print therefore is proof that the error source resides with the photo-finisher. In this case, a request for a new print is justified and likely to provide the consumer with a useable picture.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

The invention will be described in two stages: details of the test pattern with reference to FIGS. 1-3 and details of devices for producing the pattern with reference to FIGS. 4-6.

Figure 1:
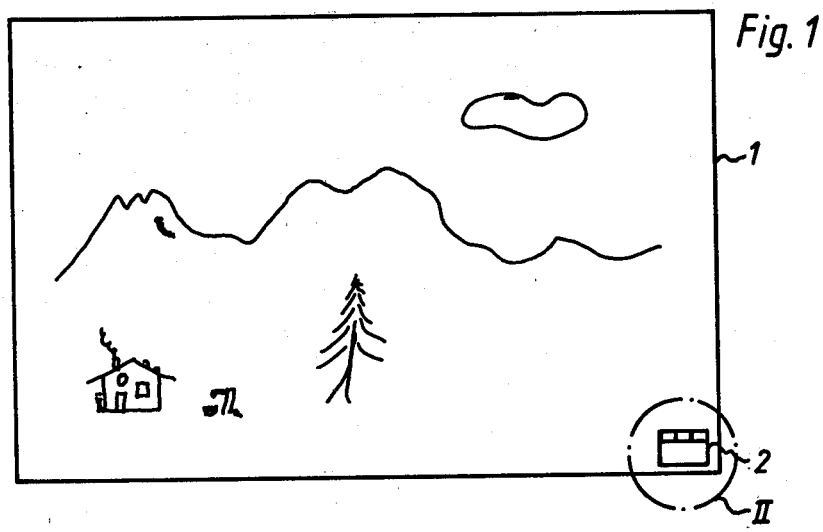
FIG. 1 is a diagrammatic view of a photographic print having a test pattern provided in its margin.

FIG. 1 shows a positive photograhic paper picture (print) 1 which is provided in its margin with a test pattern 2. Of course, it will be understood that the negative (not shown) is analogously provided with the same test pattern, also in its margin.

Figure 2:
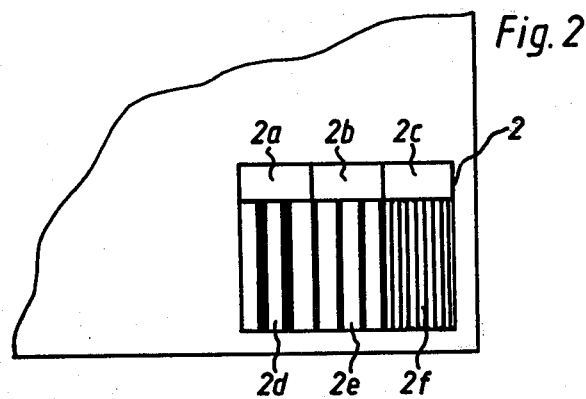
FIG. 2 is an enlarged view showing the detail from the chain-line circle II in FIG. 1.

The test pattern 2 of FIG. 1 is shown in more detail in FIG. 2. It is an e.g., rectangular area having a smaller part which is subdivided into three zones 2a, 2b and 2c. These zones advantageously each are colored in one of the three additive or subtractive primary colors. Their purpose is to afford the photo-finisher a ready check for color-filtering during printing. It should be understood that while this is a desirable feature, it does not contribute to the solution of the problems to which the invention is directed and the sections 2a-2c could therefore be omitted. Their purpose and function are in any case already known from German Published Applications De-OS 1,447,528 and DE-OS 2,603,364.

The part of the test pattern 2 which is important for the invention, resides in the larger zones 2d, 2e and 2f. Each of these carries a raster pattern (here in form of parallel bars) of different frequency. It goes without saying that patterns other than the bars are suitable, for example grid patterns, television-type test patterns (known by the French term "mire") a Siemens star, or the like. The point is that when a negative is printed on which the test pattern has been exposed in its margin, the same pattern will also be printed in its margin of the paper picture—and a single glance will suffice to show whether or not the finest of the rasters (i.e., in zone 2f) is sharp or not.

Naturally, the raster resolution (i.e., how fine or how coarse the raster patterns are to be), and or the type of test figures (e.g., a Siemens star), should be chosen by the camera manufacturer in dependence upon the type of camera involved, since it is evidently impractical to place identical expectations in simple (e.g., box) and sophisticated cameras alike. This applies, of course, only when the test pattern is imaged onto the film in the camera. As will be described further on, it is also possible to image the test pattern onto the film (negative) prior to sale, i.e., usually during manufacture, or else after the film has left the camera, e.g., in a pre-splicer used by the photo-finisher. In this event a test pattern must be used which is suitable for all camera types, regardless of their sophistication or lack thereof. The limit for the complexity of the test pattern is in such a case determined solely by the resolution capability of the film itself.

Figure 3:
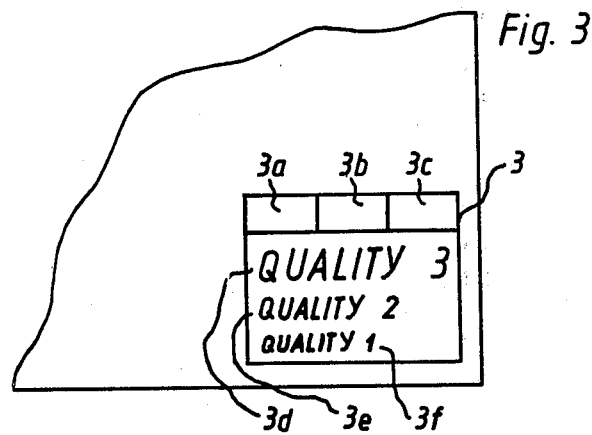
FIG. 3 is a view similar to FIG. 2, but showing a different type of test pattern.
Figure 4:
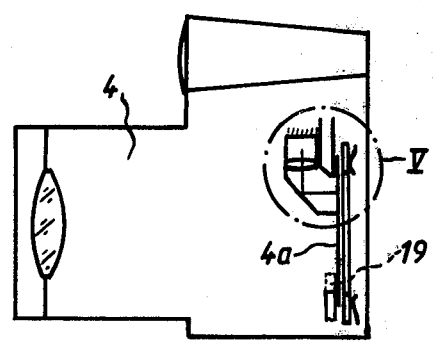
FIG. 4 is a diagrammatic side view of a photograhic camera provided with a device for exposing a test pattern onto a margin of a photographic negative.

A different exemplary test pattern 3 is shown in FIG. 3. Again, zones 3a-3c are provided which correspond to the zones 2a-2c of FIG. 2 and can be omitted without detracting from the invention. The bar-type raster patterns 2d-2f are replaced in this embodiment by writing 3d, 3e and 3f of different size, but the function is the same as before; which is to say that the level of quality of the focus of the print can be determined as a direct function of which of the writings 3d-3f is printed in full resolution. If, for example, writing 3f is completely sharp, the photographic picture on the print will be of the best quality, insofar as sharpness is concerned. If writing 3f is blurred but writing 3e is sharp, the picture will be of intermediate quality, and so on. Needless to say, any writing (or, indeed, indicium) other than those shown could be used. Equally clearly, in this and in all other embodiments it is possible to use fewer or more than the illustrated three zones 2d-2f or 3d-3f.

The imaging of the test pattern onto the film negative can most practically be effected in the camera, during picture-taking. For this purpose, a camera 4—i.e, an amateur camera as opposed to a professional camera—as shown diagrammatically in FIG. 4, may be provided with a device according to the present invention. Such a device, shown diagrammatically within the chain-line circle V of FIG. 4 and illustrated in detail in FIG. 5, may be arranged adjacent one edge of the film window 4a of the camera.

Figure 5:
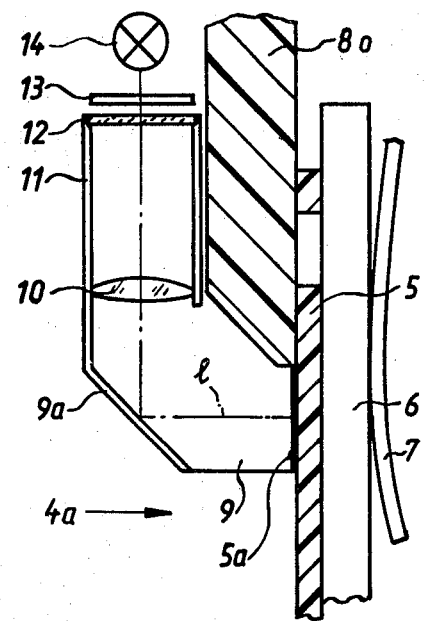
FIG. 5 is an enlarged, partly sectioned, view showing the detail from the chain-line circle V of FIG. 4.

The film window 4a is formed in the usual manner in the film support wall of the camera, of which only an edge portion 80 is visible in FIG. 5. A film pressure plate 6 is located behind this wall and spans the film window 4a; it is pressed towards the film window by a leaf spring 7 so that a portion 5a of the emulsion-carrying side of the film 5 becomes located in the film window 4a and hence in the focal plane. This is all known from the prior art.

A light conductor 9 extends from any appropriate part of the camera to the film window 4a; it has an end portion which projects beyond the edge portion 80 to the marginal zone of the film window, in such a manner that the margin of the film portion 5a (which, after making of an exposure becomes the negative) is pressed against it by the plate 6 and spring 7. The conductor 9 may be solid (e.g., fiber optics) or, as illustrated, it may be hollow. Mounted in the hollow conductor 9 is a lens 10 which images the test pattern—provided on a transparent plate 12 which is located adjacent the distal end of conductor 9—onto the film portion 5a via the mirror (or mirrored surface) 9a (light path 1) when plate 12 is illuminated via diffusor 13 by a suitable light source 14. The intensity of illumination of the plate 12 must be accommodated to the film speed, for example by the use of gray filters or by appropriately varying the duration of energization of light source 14.

If the test pattern on plate 12 includes the primary colors discussed with reference to the zones 2a-2c (FIG. 2) and 3a-3c (FIG. 3), care must be taken that the light source yields appropriate light. The light source 14 may then either be a glow lamp and the plate 12 be provided with appropriate filter strips for the color zones, or it may be a group of different-colored luminous diodes. If the color zones are omitted from the test pattern, the light source may be a single luminous diode having a relatively narrow emission spectrum; this has the advantage that the lens 10 can be a single lens (rather than the otherwise probably required multiple-lens system) but will still produce a sharp image, due to the fact that the narrow-spectrum light emitted by the diode prevents chromatic defects.

Figure 6:
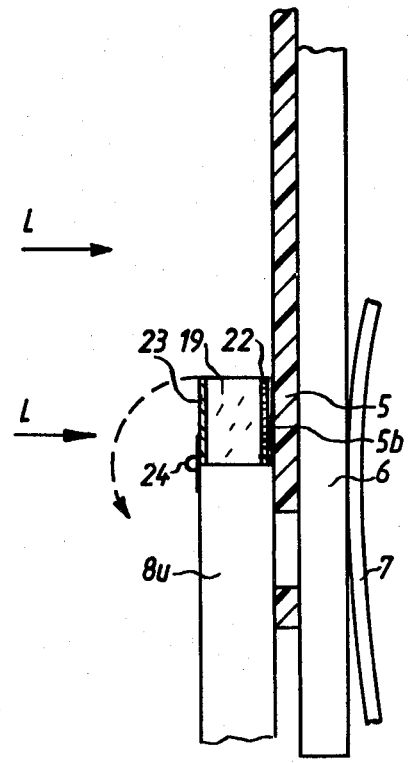
FIG. 6 is a view analogous to FIG. 5 but showing another embodiment.

A different, simpler arrangement is illustrated in FIG. 6, using a transparent block 19 as the light conductor. This arrangement is also diagrammatically shown in FIG. 4, to illustrate that it is preferably provided adjacent the lower edge of the film window 4a.

The block 19 of, e.g., glass, is so mounted that it can be pivoted about a pivot axis 24 between the illustrated operative position in which it is located opposite a margin of the film windown 4a—and hence of film portion 5a—and a withdrawn position (see the broken-line arrow) in which it is located outside the path of scene light L impinging the film window and film located therein. This allows the user to avoid imaging of the test pattern on the film, if he so desires, since this embodiment has no separate light source and depends upon the incoming scene light. Of course, in the preceding embodiment such a choice is also available if the user is provided with a switch for de-activating the light-source 14, but although in that case the test pattern is not imaged onto the film, there will be a shaded area on the film, nevertheless, unless the conductor 9 is arranged for a movement to inoperative position.

The block 19 is provided on its side which faces towards the camera objective when in operative position, with a diffusor surface or layer 23; at its side facing towards the film window it carries the test pattern or a transparent plate or layer 22 provided with the same. The incoming scene light L thus images the pattern on the film portion 5a.

In the embodiment of FIG. 6 the test pattern can become more readily damaged or dirtied than in FIG. 5. It is therefore advisable to make the block 19 easily exchangeable against a new one. Color zones with primary colors are not necessary in this embodiment, since it is the scene light itself (very often blue sky color) which illuminates the test pattern. Also, no accommodation to film speed is necessary, since scene light L is used for imaging of the test pattern.

As mentioned earlier, the test pattern (FIGS. 1-3) need not be applied to the film in the camera. It could be applied by the film manufacturer, in which case the machine imaging the manufacturer's name and the frame numbers on the film margin, may simply be provided with an additional station at which the test pattern is imaged onto the film. Also, the pattern may be applied by the photo-finisher, by adding an imaging station to the conventionally used pre-splicer.

Of course, in these cases it is not possible to chose test patterns which are accommodated to the degree of sophistication of a particular camera. A specific, well-defined placement of the test pattern on a certain region of a negative (and hence print) margin is possible with application where there is a defined relationship of film frame and film perforations, e.g., in the case of 110 and 126 film cassettes. Where this defined relationship is absent, e.g., in the case of 35 mm film, this is not possible so that for one roll of film the pattern may be located in a different region of the respective margin than for the next roll of film.

While the invention has been illustrated and described as embodied in the quality control of amateur films, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspect of this invention.

What is claimed as new and desired to be protected by Letters Patent is set forth in the appended claims.

I claim:

1. A quality control method for photographic pictures, comprising the steps of imaging a test pattern onto a marginal area of a film frame, the test pattern being a raster pattern having zones of different raster frequency and including a component indicative of image sharpness; upon conversion of the film frame into a negative, printing the test pattern in a marginal area of a positive made from the negative so that, in the event the photographic image on the positive is blurred, the absence or presence of blurring of the printed test pattern indicates whether blurring of the photographic image occurred during picture-taking or during printing of the positive; and wherein the step of imaging is carried out during manufacture of the photographic film.

2. Apparatus for carrying out the method of claim 1, comprising means for carrying a test pattern to be imaged; and an imaging station in a pre-splicer.

3. Apparatus for carrying out the method of claim 1, by imaging a test pattern onto a film frame in a photograhic camera having a film window in which the film frame is exposed, comprising first means for carrying a test pattern to be imaged, said first means being situated outside the film window; second means activatable for imaging the test pattern onto a portion of a film frame located in a marginal zone of the film window; and wherein said test pattern comprises a first component indicative of image sharpness, and a second component having at least three zones which are respectively colored in the three additive or substractive primary colors.

* * * * *